United States Patent Office 3,004,924
Patented Oct. 17, 1961

3,004,924
DEEMULSIFICATION OF OIL-IN-WATER EMULSIONS
Willard H. Kirkpatrick, Sugar Land, and Virgil L. Seale and Alice Walker, Houston, Tex., assignors to Visco Products Company, Houston, Tex., a corporation of Delaware
No Drawing. Filed Oct. 31, 1958, Ser. No. 770,919
7 Claims. (Cl. 252—344)

This invention, in general, relates to the breaking of or deemulsification of oil-in-water emulsions and has particular application to the deemulsification of naturally-occuring petroleum oil-in-water emulsions.

Oil recovered from subterranean formations often contains minor proportions of water. The oil and water often forms stable emulsions, the most common of which is a water-in-oil emulsion wherein the oil is the continuous phase of the emulsion and the water the dispersed phase. In other cases, however, where relatively large quantities of water are recovered with the oil, the phases of the emulsion are reversed so that the water forms the continuous phase and the oil the dispersed phase. This type of oil-in-water emulsion may be very stable and may require treatment with deemulsification chemicals in order to separate the oil nad water into separate components. These oil-in-water emulsions are different from water-in-oil emulsions, and treatments used to deemulsify water-in-oil emulsions are, in general, not effective to deemulsify oil-in-water emulsions.

The present invention is concerned with the breaking of or deemulsification of oil-in-water emulsions by the treatment of these emulsions with chemicals which we have found to be especially suitable for this purpose. The invention has particular application to the breaking of or deemulsification of petroleum oil-in-water emulsions which occur in petroleum oil which is recovered from subterranean formations. These emulsions may be described as naturally-occurring petroleum oil-in-water emulsions.

It is an object of the present invention to provide improvements in the breaking of or deemulsification of water-in-oil emulsions.

A more specific object of the invention is to provide improvements in the chemical treatment of petroleum oil-in-water emulsions to break the emulsions and thereby permit the oil and water components to separate.

A still further object of the invention is to provide new and improved processes for the resolving of petroleum oil-in-water emulsions into separate components of petroleum oil and water. Other objects will appear hereinafter.

In accordance with the invention, we have found certain organic polyelectrolytes will effectively cause oil-in-water emulsions to break by the addition of small quantities of the polyelectrolytes to the oil-in-water emulsion. In general, the treatment of the emulsions merely involves the mixing of the polyelectrolyte with the emulsion via agitation and thereafter permitting the emulsion to stand in a quiescent state to allow the emulsion to separate into its component parts of oil and water. Heating is not ordinarily required, although in some instances it may be advantageous to heat the emulsion to temperatures in the range of 100–200° F. An example of an instance wherein the heating of the emulsion may prove to be advantageous is in the treatment of an oil-in-water emulsion in which the fluid first is relatively viscous and the heating will lower the viscosity and, thus, further facilitate the separation of the oil and the water.

The deemulsifying chemicals used in accordance with the invention are polyelectrolytes derived by the condensation of alkyl polyhalides such as alkyl dichlorides, alkyl dibromides, etc., and polyalkylene polyamines having at least three amino groups, preferably N-unsubstituted polyalkylene polyamines. The alkyl polyhalides are preferably polychlorides or polybromides of lower alkanes having 2–5 carbon atoms and two or more chlorine atoms with the further proviso that at least two carbon atoms contain at least one chlorine atom each. Examples of preferred alkyl polyhalides are 1,2-dichloroethane, 1,2-dibromoethane, 1,3-dichloropropane, 1,3-dibromopropane, 1,4-dichlorobutane, 1,4-dibromobutane and similar polyhalo alkanes. The polyhalo alkanes preferably have at least one halogen on each terminal carbon. The other component of the organic polyelectrolytes is a polyalkylene polyamine, preferably an N-unsubstituted polyalkylene polyamine, such as diethylene triamine, dipropylene triamine, triethylene tetramine, tripropylene tetramine, tetraethylene pentamine, tetrapropylene pentamine and higher homologs thereof, including mixtures of polyalkylene polyamines having 3–10 amino groups.

The polyelectrolytes of the present invention are prepared by reacting the polyalkylene polyamine with the polyhalo alkane in amounts to provide at least one mol equivalent of amino nitrogen per mol equivalent of halogen. The mol ratio of amino nitrogen in the polyalkylene polyamine to halogen in the polyhalo alkane preferably will not exceed 3:1.

The polyelectrolytes are prepared by the addition of the polyalkylene polyamine to the polyhalo alknae. Water or a water-soluble or water-miscible liquid may be used as the vehicle for the reaction. The condensation is carried to completion by holding the reactants at elevated temperature for one to twenty-four hours.

While the polyelectrolytes may be prepared by adding the polyalkylene polyamine to the polyhalo alkane dispersed in a liquid vehicle such as water, reproducible results are best obtained by slowly adding polyhalo alkane to a mixture of the polyalkylene polyamine and the vehicle, e.g., water or ethylene glycol. The reaction may proceed with refluxing at temperatures between about 130–375° F. without appreciable variation in the properties of the polyelectrolytes produced.

In preparing the polyelectrolyte condensates of this invention, the molar ratio of reactants and the temperature employed are controlled to avoid excessive cross-linking in the condensate. Cross-linking results in a highly viscous product which is not readily dispersible in water and, hence, highly cross-linked polyelectrolytes are not desirable. However, a small amount of cross-linking may be tolerated so long as the resulting product is readily dispersible in water. It is usually desirable that the final product contain some amino nitrogen which has not been reacted with the halogen groups of the polyhalo alkane. This gives the polyelectrolytes basic characteristics. In all products a certain portion of the amino nitrogen is complexed as the hydrochloride salt—the latter resulting from the liberation of hydrochloric acid during the condensation reaction. If a finished product in substantially neutral form is desired, a calculated amount of a water-soluble acid may be added to completely neutralize all of the basic nitrogen. Examples of acids used for this purpose are phosphoric acid, acetic acid, hydroxy acetic acid, sulfuric acid, and the like.

The invention is further illustrated in the following examples wherein the parts are by weight unless otherwise indicated.

*Example I*

In a reaction vessel having a reflux condenser and a agitator, 106.8 parts of ethylene dichloride were mixed with 144 parts of water. The mixture was agitated vigorously while 170 parts of tetraethylene pentamine was slowly added. There was an initial temperature rise resulting from the exothermic reaction. The reaction mixture, under agitation, was refluxed for a period of nine hours during which time the reflux temperature rose slowly from 76° C. to about 100° C. There was a noticeable, gradual increase in viscosity of the reaction mixture. At the end of the nine-hour heating period, 54 parts of the resulting aqueous solution of the polycondensate were then blended with 72 parts of water to yield the finished product.

Example II

A polyelectrolyte condensate was prepared in accordance with the technique of Example I with the substitution of 170 parts of Polyamine H for the 170 parts of tetraethylene pentamine. Polyamine H is a mixture of tetraethylene pentamine and higher polyalkylene polyamine homologs having 6–10 amino groups. To give the final product, 72 parts of the resulting solution of the polyelectrolytes were blended with 81 parts of water.

Example III

The preparatory technique of Example I was repeated with the substitution of an equal weight of diethylene triamine for the tetraethylene pentamine.

Example IV

The preparatory technique of Example I was repeated with the substitution of 120 parts of 1,3-dichloropropane for the 106 parts of ethylene dichloride.

Example V

In the reaction vessel described in Example I, 170 parts by weight of Amine CE–46 (the polyalkylene polyamine mixture consisting of tetraethylene pentamine and higher homologs) and 100 parts of water were mixed and heated to 60° C. One hundred thirty parts of ethylene dichloride were added in increments and the mixture was refluxed at 90–100° C. for six hours. The finished product was prepared by blending the resulting product with water in accordance with the ratio given in Example II.

Example VI

The preparatory technique of Example I was repeated with the substitution of 196 parts of dipropylene triamine for the 170 parts of tetraethylene pentamine.

The effectiveness of the polyelectrolytes heretofore described in the deemulsification of petroleum oil-in-water emulsions is shown in the following tests.

In the laboratory, bottle tests were conducted with samples of well fluid. In one instance, 100 ml. samples of an oil-in-water emulsion well fluid obtained from Muldoon Field in Texas, were added to a series of calibrated prescription bottles. Ten percent aqueous solutions of the deemulsifying chemicals to be tested were prepared and 0.06 ml. of each 10% solution was pipetted into the prescription bottles containing 100 ml. of the emulsion. The bottles were then capped and rolled 50 times. The emulsion was then allowed to remain quiescent for five minutes. The bottles were then visually inspected to determine which bottle contained the least amount of oil in the aqueous layer of eight chemicals tested at this treating dosage of 60 parts of active deemulsifying chemical per million parts of oil-in-water emulsion. The products of Examples I and II gave the best results. The commercial deemulsifying chemical used with this oil at the time the tests were made showed only a slight treating effect in comparison with the products of Examples I and II.

In a similarly conducted bottle test with a sample of an oil-in-water emulsion, well fluid obtained from Jourdanton Field, Texas, at a treating ratio of 20 parts of active deemulsifying chemical per million parts of emulsion and with 25 rolls instead of 50 rolls, the product of Example I gave the best separation of the six chemicals tested. The amount of residual oil in the aqueous layer was less in the sample treated with the product of Example I.

In a field test, the deemulsifying chemical of Example I was tested on a lease in Colorado which consisted of seven pumping wells. The oil-in-water emulsion was treated on the lease with a heater treater. The treatment of the emulsion involved the addition of the deemulsifying chemical of Example I in a ratio of 2000 parts of deemulsifying chemical per million parts of emulsion in combination with the heating of the emulsion to a temperature of 160° F. Tests with other deemulsifying chemicals of types different from those contemplated by the instant invention had been unsuccessful in that the deemulsification resulted in water having large amounts of oil therein. The amounts of oil were so great in the water-settling pits that the pits had to be burned off several times a day. After the deemulsified chemical of Example I had been in use for only two days, the amount of oil retained in the water after the deemulsification step was reduced so much that pit burning was unnecessary.

The chemical treatments of petroleum oil-in-water emulsions in accordance with our invention may be carried out at atmospheric temperature or with heating of the emulsion to temperatures ordinarily not higher than 160° F. The preferred treating temperature is in the range of 80 to 180 F. The ratio of the active deemulsifying chemical to the emulsion on a weight basis usually will be within the range of 10 to 2000 parts per million parts of the emulsion. Optimum temperatures and amounts of treating chemical for a particular emulsion may be determined by preliminary laboratory routine.

The invention is hereby claimed as follows:

1. A process for resolving an oil-in-water emulsion into its component parts which comprises mixing into said oil-in-water emulsion an emulsion-breaking quantity of a water-dispersible, organic polyelectrolyte derived by the condensation of polyhalo lower alkane having a halogen group on two different carbons and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and oil phases.

2. A process for resolving an oil-in-water emulsion into its component parts which comprises mixing into said oil-in-water emulsion an emulsion-breaking quantity of a water-dispersible, organic polyelectrolyte derived by the condensation of a dichloro lower alkane having the chloro groups on different carbons and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and oil phases.

3. A process for resolving an oil-in-water emulsion into its component parts which comprises mixing into said oil-in-water emulsion an emulsion-breaking quantity of a water-dispersible, organic polyelectrolyte derived by the condensation of a dichloro lower alkane having the chloro groups on terminal carbons and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and oil phases.

4. A process for resolving an oil-in-water emulsion into its component parts which comprises mixing into said oil-in-water emulsion an emulsion-breaking quantity of a water-dispersible, organic polyelectrolyte derived by the condensation of a dibromo lower alkane having the bomo groups on different carbons and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and oil phases.

5. A process for resolving an oil-in-water emulsion into its component parts which comprises mixing into said oil-in-water emulsion an emulsion-breaking quantity of a water-dispersible, organic polyelectrolyte derived by the condensation of a dibromo lower alkane having the bromo groups on terminal carbons and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and oil phases.

6. A process for resolving a petroleum oil-in-water emulsion into its component parts which comprises mixing into said petroleum oil-in-water emulsion an emulsion-breaking quantity of a water-dispersible, organic polyelectrolyte derived by the condensation of ethylene dichloride and a polyalkylene polyamine at a mol ratio of amino nitrogen in said polyamine to the halogen in said alkane in the range of 1:1 to 3:1, respectively, for 1 to 24 hours at 130–375° F., said polyalkylene polyamine having 2–3 carbons in the alkylene groups, and separating the resulting water and petroleum oil phases.

7. A process for resolving a petroleum oil-in-water emulsion into its component parts which comprises mixing into said petroleum oil-in-water emulsion an emulsion-breaking quantity of a water-dispersible, organic polyelectrolyte derived by the condensation of ethylene dichloride and a tetraethylene pentamine at a mol ratio of amino nitrogen in said tetraethylene pentamine to chloro groups in said ethylene dichloride in the range of 1:1 to 3:1, respectively, for 1 to 24 hours at 130–375° F, and separating the resulting water and petroleum oil phases.

References Cited in the file of this patent

UNITED STATES PATENTS

| | | |
|---|---|---|
| 2,290,154 | Blair | July 21, 1942 |
| 2,407,895 | Monson et al. | Sept. 17, 1946 |
| 2,589,199 | Monson | Mar. 11, 1952 |
| 2,589,200 | Monson | Mar. 11, 1952 |
| 2,589,201 | Monson | Mar. 11, 1952 |